United States Patent
Zwicky et al.

(10) Patent No.: US 9,612,596 B2
(45) Date of Patent: Apr. 4, 2017

(54) HANDS-OFF STEERING WHEEL GOVERNED BY PEDESTRIAN DETECTION

(71) Applicant: Ford Global Technologies, LLC, Dearborn, MI (US)

(72) Inventors: Timothy D. Zwicky, Dearborn, MI (US); Christopher Scott Nave, Ypsilanti, MI (US); Andy Chuan Hsia, Ann Arbor, MI (US); Levasseur Tellis, Southfield, MI (US); Reid James Steiger, Franklin, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 24 days.

(21) Appl. No.: 14/704,073

(22) Filed: May 5, 2015

(65) Prior Publication Data
US 2016/0325779 A1  Nov. 10, 2016

(51) Int. Cl.
*G05D 1/00* (2006.01)
*G01S 13/93* (2006.01)
(Continued)

(52) U.S. Cl.
CPC .......... *G05D 1/0061* (2013.01); *B60W 30/09* (2013.01); *B62D 5/04* (2013.01); *B62D 6/00* (2013.01); *B62D 6/02* (2013.01); *G01S 13/931* (2013.01); *G08G 1/165* (2013.01); *G08G 1/166* (2013.01); *G01S 2013/935* (2013.01);
(Continued)

(58) Field of Classification Search
CPC ... B62D 6/00; B62D 6/02; B62D 5/04; G05D 1/0061; B60W 30/09; G08G 1/16; G08G 1/165; G01S 13/931; G01S 2013/9342; G01S 2013/9346;
(Continued)

(56) References Cited

U.S. PATENT DOCUMENTS 5,485,892 A * 1/1996 Fujita ............... B62D 6/00
  701/70
8,195,394 B1  6/2012 Zhu et al.
(Continued)

FOREIGN PATENT DOCUMENTS

DE  102009003203 A1  11/2010
DE  2012112802 A1  6/2014
GB  2484404 A  11/2012

OTHER PUBLICATIONS

Case, "Want a self-driving car? Look on the driveway", Dec. 18, 2014, http://fortune.com/2014/12/06/autonomous-vehicle-revolution/ (8 pages).
(Continued)

*Primary Examiner* — Dale W Hilgendorf
(74) *Attorney, Agent, or Firm* — Frank A. MacKenzie; Bejin Bieneman PLC

(57) ABSTRACT

A vehicle may be steered without a driver's hands being on a vehicle steering control mechanism. A presence of an object within a predetermined distance of the vehicle may be detected using data from at least one object detection sensor that provides data to at least one of a passive safety system, a lane control system, a speed control system, and a brake control system. A steering control mechanism hands-on mode can then be enabled based at least in part on the presence of the object.

20 Claims, 2 Drawing Sheets

(51) Int. Cl.
  *G08G 1/16* (2006.01)
  *B60W 30/09* (2012.01)
  *B62D 6/00* (2006.01)
  *B62D 6/02* (2006.01)
  *B62D 5/04* (2006.01)

(52) U.S. Cl.
  CPC ............... *G01S 2013/9342* (2013.01); *G01S 2013/9346* (2013.01); *G01S 2013/9353* (2013.01)

(58) Field of Classification Search
  CPC ....... G01S 2013/935; G01S 2013/9353; G01S 2013/9357
  See application file for complete search history.

(56) References Cited

U.S. PATENT DOCUMENTS

| | | | |
|---|---|---|---|
| 8,509,982 B2 | 8/2013 | Montemerlo et al. | |
| 8,718,861 B1 | 5/2014 | Montemerlo et al. | |
| 8,818,608 B2 | 8/2014 | Cullinane et al. | |
| 2004/0193374 A1* | 9/2004 | Hac | G08G 1/166 701/301 |
| 2007/0198145 A1* | 8/2007 | Norris | G05D 1/0061 701/23 |
| 2010/0063736 A1* | 3/2010 | Hoetzer | G08G 1/166 701/301 |
| 2012/0296528 A1* | 11/2012 | Wellhoefer | B62D 1/046 701/48 |
| 2013/0197762 A1 | 8/2013 | Schuberth et al. | |
| 2013/0226408 A1* | 8/2013 | Fung | B62D 6/00 701/41 |
| 2013/0231830 A1* | 9/2013 | Van Dan Elzen | B62D 6/00 701/41 |
| 2014/0277893 A1* | 9/2014 | Rosol | B62D 6/00 701/23 |
| 2014/0303827 A1 | 10/2014 | Dolgov et al. | |
| 2015/0088357 A1* | 3/2015 | Yopp | G05D 1/0061 701/23 |
| 2015/0120124 A1* | 4/2015 | Bartels | G05D 1/0061 701/23 |
| 2015/0211870 A1* | 7/2015 | Nickolaou | G08G 1/165 701/28 |
| 2016/0039428 A1 | 2/2016 | Odate | |

OTHER PUBLICATIONS

UK Search Report dated Oct. 24, 2016 (4 pages).

* cited by examiner

HANDS-OFF STEERING WHEEL GOVERNED BY PEDESTRIAN DETECTION

BACKGROUND

A vehicle such as an automobile may be operated or controlled by one or more computing devices such that the vehicle is operated autonomously or semi-autonomously. In a semi-autonomous mode a vehicle computer may control some, but not all, of vehicle operations, e.g., a driver may operate some but not all vehicle controls, the vehicle computer providing certain instructions that otherwise would be provided by a driver. For example, a driver could control or provide input to influence vehicle speed, while the computer controls vehicle steering, or vice versa. In an autonomous mode the vehicle computer may control all or virtually all vehicle operations, e.g., relating to steering, speed, routing, etc.

However, even when a driver is not responsible for certain vehicle operations, i.e., a vehicle is operated at least in a semi-autonomous mode, to promote the safety of the vehicle as well as surrounding vehicles and/or pedestrians, it may be desired for the driver to be able to assume control of vehicle operations from the vehicle computer. For example, when a vehicle computer is controlling steering, it may be desirable for a human driver to be able to quickly assume steering control, particularly when pedestrians are proximate to the vehicle. Accordingly, there is a need for less expensive and more efficient mechanisms for determining driver readiness to assume steering control, e.g., for determining when a driver's hands are on a steering wheel.

DRAWINGS

DETAILED DESCRIPTION

Introduction

Figure 1:
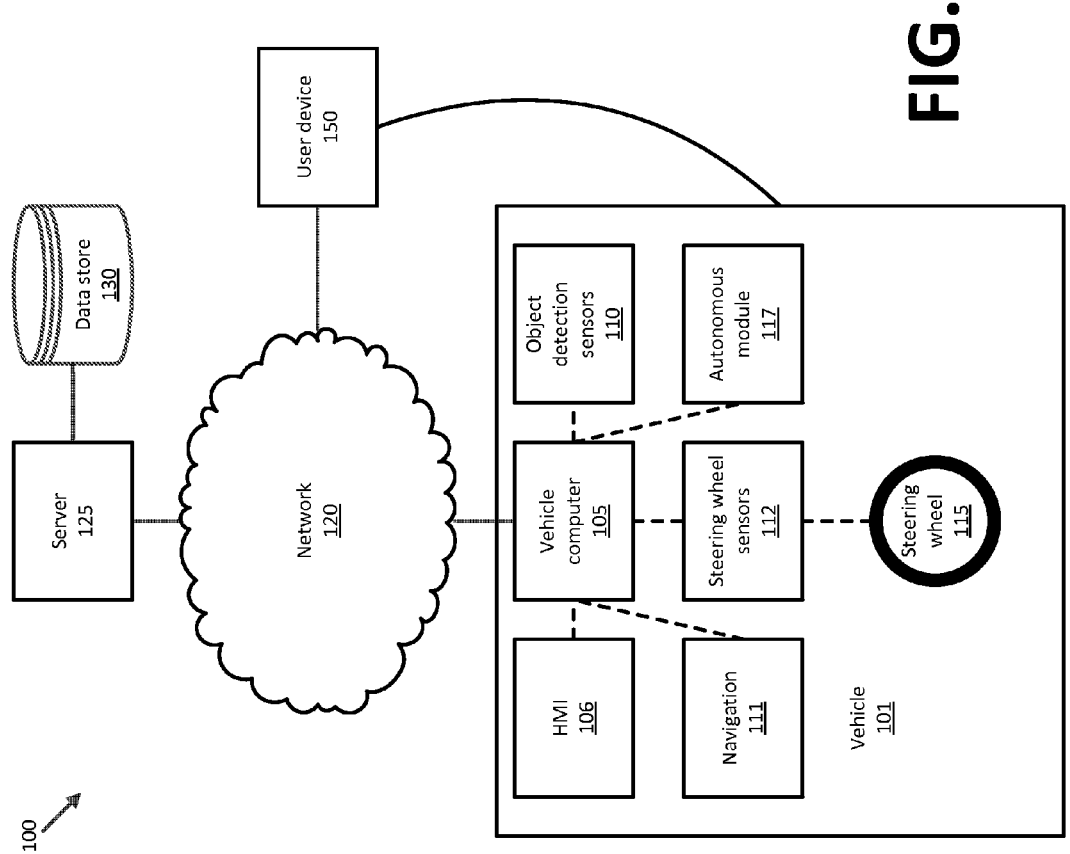
FIG. 1 is a block diagram of an example system for pedestrian detection and steering wheel management.

FIG. 1 is a block diagram of an example system 100 for vehicle 101 pedestrian detection and governance of hands-off steering operations, i.e., operations when a driver's hands are not on a steering control mechanism such as a steering wheel 115. A computer 105 in the vehicle 101 receives input from pedestrian detection sensors 110, e.g., conventional sensors that may be used in a vehicle 101 to provide collected data that the computer 105 may use to determine whether a pedestrian is proximate to, e.g., within a predetermined distance of, the vehicle 101. For example, such sensors 110 may be installed in a vehicle 101 to support passive safety systems or the like. The computer 105 may further receive data from steering mechanism sensors 112, e.g., included in a vehicle 101 steering wheel 115, the steering wheel sensor 112 data indicating whether a driver's hands are on the steering wheel 115. If the computer 105 determines that a pedestrian is not proximate to the vehicle 101, then a steering wheel 115 hands-off mode may be permitted. For example, a driver may be permitted to take his or her hands off the steering wheel 115 without the computer 105 causing an alarm or the like to be raised through a human machine interface (HMI) 106 communicatively coupled to the computer 105. However, if the computer 105 determines that a pedestrian is proximate to the vehicle 101, then the computer 105 may initiate a steering wheel 115 hands-on mode in which the HMI 106 is used to raise an alarm or the like if the driver's hands are not detected to be on the steering wheel 115. Further, although the system 100 is sometimes referred to herein as a pedestrian detection system 100, it is to be understood that the presently disclosed systems and method could additionally or alternatively encompass detection of other objects, e.g., rails, barriers, trees, rocks, bicycles, etc., to support a steering wheel 115 "hands-on" or "hands-off" determination as discussed herein.

System Elements

A vehicle 101 computer 105 generally includes a processor and a memory, the memory including one or more forms of computer-readable media, and storing instructions executable by the processor for performing various operations, including as disclosed herein. The memory of the computer 105 further generally stores data received from one or more of pedestrian detection sensors 110, a navigation subsystem 111, steering wheel sensors 112, and/or other sensors, controllers, and/or data collection devices that may be provided in the vehicle 101 and that may provide information via a communications bus or the like in the vehicle 101. The computer 105 further may provide output such as information, alerts, etc. for a vehicle 101 driver, in a variety of ways, e.g., via the HMI 106, a remote user device 150 such as a smart phone or the like, etc.

Accordingly, the computer 105 is generally configured for communications on a controller area network (CAN) bus or the like, and/or may use other wire or wireless protocols, e.g., BLUETOOTH, etc. That is, the computer 105 can communicate via various mechanisms that may be provided in the vehicle 101 and/or other devices such as a user device 150. The computer 105 may also have a connection to an onboard diagnostics connector (OBD II) port, e.g., according to the J1962 standard. Via the CAN bus, OBD II connector port, and/or other wired or wireless mechanisms, the computer 105 may transmit messages to various devices in a vehicle and/or receive messages from the various devices, e.g., controllers, actuators, sensors, etc. In addition, the computer 105 may be configured for communicating, e.g., with one or more remote servers 125, with a network 120, which, as described below, may include various wired and/or wireless networking technologies, e.g., cellular, Bluetooth, wired and/or wireless packet networks, etc.

An HMI 106 included in or associated with the computer 105 may include a variety of known mechanisms for allowing a user to interface with the computer 105. For example, the HMI 106 could include a microphone, a speaker, text to speech, speech recognition processing capability, etc., for allowing verbal and/or audio interaction with the computer 105, e.g., in the form of an interactive voice response (IVR) system such as is known. Further, the HMI 106 could include a visual display, touchscreen, or the like, and/or other input/output mechanisms.

The navigation sub-system, e.g., global positioning system (GPS), 111 is generally known for a variety of operations. These include using GPS satellites to determine geo-coordinates, i.e., latitude and longitude, of a vehicle 101. The GPS 111 may also receive input, e.g., a street address or the like, of an intended destination of a vehicle 101. Further, the GPS 111 may generate a route to be followed to the intended destination.

Object detection sensors 110 may include a variety of devices for detecting objects outside of a vehicle 101, including pedestrians, and, advantageously, typically include devices currently deployed in vehicles for detecting objects including pedestrians for various purposes. For example, current vehicles 101 may include sensors 110 for lane control, speed control, braking control, etc., as well as for activating passive safety systems, e.g., in bumpers, hoods, doors, etc., to protect pedestrians, such systems being activated based at least in part on data from one or more sensors 110, including data relating to pedestrians and/or other objects, e.g., rails, barriers, trees, rocks, bicycles, etc. For example, sensors 110 could include mechanisms such as RADAR, LADAR, sonar, cameras or other image capture devices, that could be deployed to identify possible pedestrians and/or other objects, measure a distance between the vehicle 101 and pedestrians and/or other objects, etc. Advantageously, the use of object detection sensor 110 data as disclosed herein replies on only detection of the existence and proximity of pedestrians (and/or other object(s)), and does not require further refinements of existing sensing systems.

Sensors 112 could likewise include one or more of a variety of sensing devices, e.g., capacitive sensors or the like embedded in the steering wheel 115, cameras in the vehicle 101 providing images indicating whether a driver's hands are on the steering wheel 115, etc.

Generally included in instructions stored in and executed by the computer 105 is an autonomous driving module 117. Using data received in the computer 105, e.g., from sensor 110, 112 data, navigation sub-system 111, a remote server 125, etc., the module 117 may control various vehicle 101 components and/or operations without a driver to operate the vehicle 101. For example, various sensors and/or controllers in a vehicle may operate to provide collected data 115 via the CAN bus, e.g., collected data relating to vehicle speed, acceleration, etc. Further, sensors or the like, global positioning system (GPS) equipment, etc., could be included in a vehicle and configured to provide data directly to the computer 105, e.g., via a wired or wireless connection.

For example, the module 117 may be used to regulate vehicle 101 speed, acceleration, deceleration, steering, distance between vehicles and/or amount of time between vehicles, lane-change minimum gap between vehicles, left-turn-across-path minimum, time-to-arrival, intersection (without signal) minimum time-to-arrival to cross the intersection, etc. Further, the module 117 may learn the desired speed, acceleration, deceleration, steering, car following time headway, lane change minimum gap, turn-across path minimum time-to-arrival, etc., based on specific previously visited locations and/or traversed routes and headings as driven by a particular vehicle 101 driver, thereby providing a naturalistic feel relative to what the driver expects to experience, e.g., by providing operations at specific locations that mimic maneuvers that the driver may have performed. In particular, the module 117 may allow the vehicle 101 to be operated without a driver's hand on the steering wheel 115.

The network 120 represents one or more mechanisms by which a vehicle 101 computer 105 may communicate with a remote server 125, including to obtain data. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using BLUETOOTH, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various of the steps and processes described herein. The server 125 generally includes and/or is communicatively coupled to one or more data stores 130.

A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, BLUETOOTH, and/or cellular communications protocols. Further, the user device 150 may use such communications capabilities to communicate via the network 120 and also directly with a vehicle computer 105, e.g., using an in vehicle communications mechanism, e.g., BLUETOOTH. Accordingly, the computer 105 could control access to one or more applications on a device 150 accessed via an HMI 106 connected to computer 105.

Process

Figure 2:
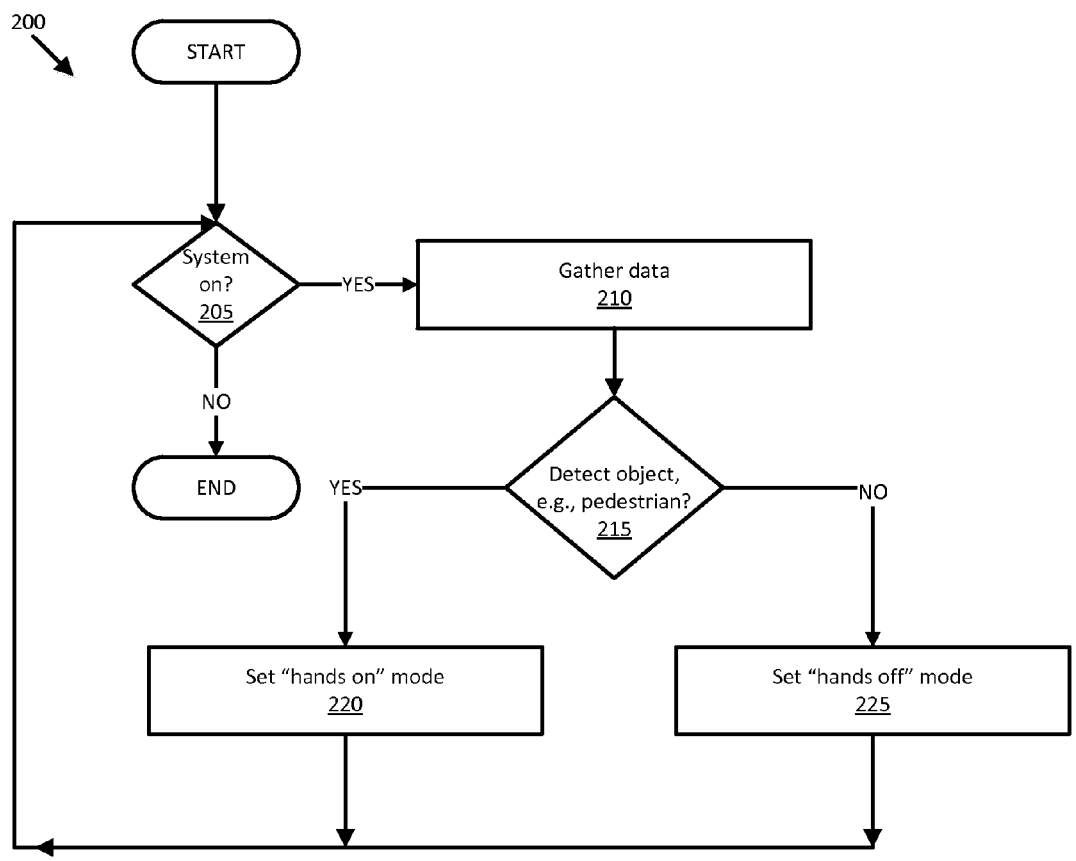
FIG. 2 is a diagram of an example process for pedestrian detection and steering wheel management.

FIG. 2 is a diagram of an example process 200 for pedestrian and/or other object detection and steering wheel management. The process 200 is generally executed by a processor of the computer 105 according to instructions stored in a memory thereof. The process 200 is generally executed when a vehicle 101 computer 105 is providing autonomous or semi-autonomous operation of the vehicle 101. That is, the process 200 may be executed when the computer 105 is controlling some or all operations of the vehicle 101, generally including steering.

The process 200 begins in a block 205, the computer 105 determines whether the detection system 100 is active, e.g., whether the computer 105 is executing, or has been instructed to execute, programming to carry out pedestrian detection and implementation of "hands-on" and "hands-off" modes as described herein. That is, the computer 105 determines whether the process 200 should continue. For example, the computer 105 could receive user input to activate or deactivate the system 100, the vehicle 101 may be powered off or on, put in a "stop" or "run" state, autonomous or semi-autonomous operations may be disabled, etc., indicating that the system 100 should be activated or deactivated. In any case, if the process 200 should continue, then the process 200 proceeds to the block 210. Otherwise, the process 200 ends following the block 205.

In the block 210, which may follow the block 205, the computer 105 gathers data from object detection sensors 110 and steering wheel sensors 112.

Next, in the block 215, the computer 105, using data gathered from the sensors 110 as described with respect to the block 215, determines whether one or more pedestrians and/or other objects are detected proximate to the vehicle 101. For example, "proximate" could mean within a predetermined distance, e.g., a radius of five meters, 10 meters, 20 meters, 25 meters, etc. A pedestrian could be detected according to mechanisms described above, e.g., image sensors, radar, lidar, etc., used to predict the existence and position of a pedestrian with respect to the vehicle 101. Such data could be combined with data from the navigation sub-system 111, although, advantageously, the computer 105 when executing the process 200 does not require navigation system 111 data. Likewise, the computer 105 could use, but does not require, data provided via a network 120, e.g., from a remote server 125, concerning a likely concentration of pedestrians in an area through which the vehicle 101 is traveling, conditions such as visibility, weather, etc. relating to pedestrian safety, safe speeds of travel of the vehicle 101, etc. In any case, if a pedestrian is detected, then a block 220 is executed next. Otherwise, the process 200 proceeds to a block 225.

In the block 220, the computer 105 sets the system 100 to a hands-on mode (to which the system 100 may be set by default). In the "hands-on" mode, on the other hand, the computer 105 is programmed to require that a driver's hands are on the steering wheel 115, even where the computer 105 is at least semi-autonomously operating the vehicle 101 by controlling steering operations. Where the "hands-on" mode is enabled, the computer 105 may cause the HMI 106 to display an alert or message, e.g., a sound, vibration of the steering wheel 115 via a haptic device embedded in the steering wheel 115, a message displayed on a display, an audio message, etc., indicating that the driver's hand should be on the steering wheel 115. Such message or alert may be provided only if a driver's hands are not on the steering wheel 115, or, in at least some instances, e.g., where pedestrians are proximate to the vehicle 101, regardless of whether a driver's hands are on the steering wheel. Moreover, in some instances, in the "hands-on" mode, if a driver's hands are not on the steering wheel 115, the computer 105 may be programmed to cause of the vehicle 101 to cease operations, e.g., slow and/or stop, pull to a roadside, parking area, etc. Following the block 220, the process 200 returns to the block 205.

In the "hands-off" mode, which may be set in the block 225, the computer 105 is programmed to allow a driver to take his or her hands off the steering wheel 115. For example, when the vehicle 101 is in an area where no pedestrians and/or other objects are detected, where other vehicles are not present or are traveling at a distance and speed that may be safely predicted by the computer 105, etc., the "hands-off" mode may be enabled. Following the block 225, the process 200 returns to the block 205.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer executable instructions may be compiled or interpreted from computer programs created using a variety of programming languages and/or technologies, including, without limitation, and either alone or in combination, Java™, C, C++, VISUAL BASIC®, JAVASCRIPT®, PERL®, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising computer comprising a processor and a memory, wherein the computer is programmed to:
steer a vehicle without a driver's hands being on a vehicle steering control mechanism;
determine a presence of an object within a predetermined distance of the vehicle using data from at least one object detection sensor that provides data to at least one of a passive safety system, a lane control system, a speed control system, and a brake control system;
upon determining the presence of the object within the predetermined distance, detect whether the driver's hands are on the steering control mechanism; and
if the driver's hands are not detected on the steering control mechanism, actuate a vehicle component to enforce the driver's hand being on the steering control mechanism, the vehicle component being actuated only if the driver's hands are not detected on the steering control mechanism.

2. The system of claim 1, wherein the component is a human machine interface, whereby the computer is further programmed to provide a message to the driver upon detecting that the driver's hands are not on the steering control mechanism.

3. The system of claim 1, wherein the at least one object detection sensor includes at least one of a camera, a radar, and a lidar.

4. The system of claim 1, wherein the computer is further programmed to detect the object based at least in part on data from a navigation system.

5. The system of claim 1, wherein the computer is further programmed to actuate the vehicle component based at least in part on a speed of the vehicle.

6. The system of claim 1, wherein the steering control mechanism is a steering wheel.

7. The system of claim 1, wherein the computer is further programmed to actuate the vehicle component based at least in part on data received from a remote server.

8. The system of claim 1, wherein the computer is further programmed to perform at least one of controlling a speed and braking of the vehicle without the driver's input.

9. The system of claim 1, wherein the object is a pedestrian.

10. The system of claim 1, wherein the computer is further programmed to operate the vehicle autonomously after actuating the vehicle component.

11. A method, comprising:
steering a vehicle without a driver's hands being on a vehicle steering control mechanism;
determining a presence of an object within a predetermined distance of the vehicle using data from at least one object detection sensor that provides data to at least one of a passive safety system, a lane control system, a speed control system, and a brake control system; and
upon determining the presence of the object within the predetermined distance, detecting whether the driver's hands are on the steering control mechanism;
if the driver's hands are not detected on the steering control mechanism, actuating a vehicle component to enforce the driver's hand being on the steering control mechanism, the vehicle component being actuated only if the driver's hands are not on the steering control mechanism.

12. The method of claim 11, further comprising providing a message to the driver upon detecting that the driver's hands are not on the steering control mechanism.

13. The method of claim 11, wherein the at least one object detection sensor includes at least one of a camera, a radar, and a lidar.

14. The method of claim 11, further comprising actuating the vehicle component based at least in part on data from a navigation system.

15. The method of claim 11, further comprising actuating the vehicle component based at least in part on a speed of the vehicle.

16. The method of claim 11, wherein the steering control mechanism is a steering wheel.

17. The method of claim 11, further comprising actuating the vehicle component based at least in part on data received from a remote server.

18. The method of claim 11, further comprising performing at least one of controlling a speed and braking of the vehicle without the driver's input.

19. The method of claim 11, wherein the object is a pedestrian.

20. The method of claim 11, further comprising operating the vehicle autonomously after actuating the vehicle component.

* * * * *

UNITED STATES PATENT AND TRADEMARK OFFICE
CERTIFICATE OF CORRECTION

| | | |
|---|---|---|
| PATENT NO. | : 9,612,596 B2 | Page 1 of 1 |
| APPLICATION NO. | : 14/704073 | |
| DATED | : April 4, 2017 | |
| INVENTOR(S) | : Timothy D. Zwicky et al. | |

It is certified that error appears in the above-identified patent and that said Letters Patent is hereby corrected as shown below:

In the Claims

Column 8, in Line 10, Claim 11, replace "are not on the" with -- are not detected on the --.

Signed and Sealed this
Twelfth Day of September, 2017

Joseph Matal
*Performing the Functions and Duties of the
Under Secretary of Commerce for Intellectual Property and
Director of the United States Patent and Trademark Office*